United States Patent
Gorla et al.

(10) Patent No.: US 8,451,279 B2
(45) Date of Patent: May 28, 2013

(54) SYSTEM, METHOD AND COMPUTER PROGRAM PRODUCT FOR ADJUSTING A REFRESH RATE OF A DISPLAY

(75) Inventors: Gabriele Gorla, Santa Clara, CA (US); Manish Modi, San Jose, CA (US)

(73) Assignee: NVIDIA Corporation, Santa Clara, CA (US)

(*) Notice: Subject to any disclaimer, the term of this patent is extended or adjusted under 35 U.S.C. 154(b) by 485 days.

(21) Appl. No.: 11/610,420

(22) Filed: Dec. 13, 2006

(65) Prior Publication Data
US 2008/0143728 A1 Jun. 19, 2008

(51) Int. Cl.
*G06F 15/00* (2006.01)
*G06F 3/038* (2006.01)
*G09G 5/00* (2006.01)

(52) U.S. Cl.
CPC .......... *G06F 15/00* (2013.01); *G06F 3/038* (2013.01); *G09G 5/00* (2013.01)
USPC ........................................ 345/501; 345/204

(58) Field of Classification Search
USPC ....................................................... 345/204
See application file for complete search history.

(56) References Cited

U.S. PATENT DOCUMENTS

| | | | |
|---|---|---|---|
| 5,841,430 A | 11/1998 | Kurikko | |
| 6,441,812 B1 | 8/2002 | Voltz | 345/713 |
| 6,618,095 B1 | 9/2003 | Takeuchi et al. | |
| 6,862,022 B2 * | 3/2005 | Slupe | 345/207 |
| 6,900,820 B2 * | 5/2005 | Kataoka et al. | 345/690 |
| 7,119,803 B2 * | 10/2006 | Stanley et al. | 345/211 |
| 7,177,448 B1 | 2/2007 | Sah | |
| 7,362,295 B2 * | 4/2008 | Park et al. | 345/89 |
| 7,499,043 B2 * | 3/2009 | Vasqnez et al. | 345/212 |
| 7,586,484 B2 | 9/2009 | Sampsell et al. | 345/204 |
| 7,898,535 B2 | 3/2011 | Juenger | |
| 7,920,135 B2 * | 4/2011 | Sampsell et al. | 345/204 |
| 8,179,388 B2 | 5/2012 | Wyatt et al. | |
| 8,207,977 B1 | 6/2012 | Kumar et al. | |
| 8,284,210 B1 | 10/2012 | Kumar et al. | |
| 2003/0007070 A1 | 1/2003 | Lipton et al. | |
| 2003/0016215 A1 | 1/2003 | Slupe | |
| 2003/0222876 A1 | 12/2003 | Giemborek et al. | |
| 2004/0252115 A1 * | 12/2004 | Boireau | 345/211 |
| 2006/0039466 A1 | 2/2006 | Emerson et al. | |
| 2006/0077127 A1 | 4/2006 | Sampsell et al. | 345/55 |

(Continued)

FOREIGN PATENT DOCUMENTS

EP 1265210 A1 12/2002
EP 1640951 A2 * 3/2006

(Continued)

OTHER PUBLICATIONS

Cho, Sukjae, "Power Management of iPAQ" USC Information Sciences Institute.

(Continued)

*Primary Examiner* — Bipin Shalwala
*Assistant Examiner* — Ilana Spar
(74) *Attorney, Agent, or Firm* — Zilka-Kotab, PC (57) ABSTRACT

A display refresh system, method and computer program product are provided. In use, at least one aspect of a display of content is identified by monitoring commands. Based on such identified aspect(s), a refresh rate of a display utilized for the display of the content may be adjusted.

23 Claims, 5 Drawing Sheets

U.S. PATENT DOCUMENTS

| | | | |
|---|---|---|---|
| 2006/0085616 A1* | 4/2006 | Zeighami et al. | 711/167 |
| 2006/0146056 A1 | 7/2006 | Wyatt | 345/501 |
| 2007/0076008 A1 | 4/2007 | Osborne | |
| 2007/0146294 A1* | 6/2007 | Nurmi et al. | 345/102 |
| 2008/0001934 A1* | 1/2008 | Wyatt | 345/204 |
| 2008/0030615 A1 | 2/2008 | Vasquez et al. | |
| 2008/0055318 A1 | 3/2008 | Glen | |
| 2008/0100598 A1* | 5/2008 | Juenger | 345/204 |
| 2008/0204481 A1* | 8/2008 | Mostinski | 345/690 |
| 2008/0309652 A1 | 12/2008 | Ostlund | |

FOREIGN PATENT DOCUMENTS

| | | |
|---|---|---|
| JP | 11003063 A | 1/1999 |
| KR | 1020050056796 A | 6/2005 |
| TW | 487900 B | 5/2002 |
| TW | 511073 B | 11/2002 |
| TW | I277059 B | 3/2007 |
| WO | WO 03100759 A1 * | 12/2003 |

OTHER PUBLICATIONS

Shah et al. "Enabling Great Battery Life: The Value and the Methods for Laptop Platforms" Intel Developer Forum.
U.S. Appl. No. 11/867,418, filed Oct. 4, 2007.
U.S. Appl. No. 11/867,445, filed Oct. 4, 2007.
U.S. Appl. No. 11/611,805, filed Dec. 15, 2006.
Office Action Summary from U.S. Appl. No. 11/611,805 mailed on Nov. 2, 2009.
Chinese Office Action Summary from application No. 200710195331.5 mailed on Jun. 19, 2009.
Chinese Office Action Summary from application No. 2007101953315 mailed on Dec. 25, 2009.
Final Office Action from U.S. Appl. No. 11/611,805, dated May 27, 2010.
Notice of Preliminary Rejection (Non-Final) from the Korean Intellectual Property Office for Korean Patent Application No. 10-2007-128183, mailed Feb. 26, 2010.
Korean Office Action Summary from application No. 10-2007-0128183 dated Aug. 28, 2010 (no translation).
Notice of Reasons for Rejection from Japanese Patent Application No. 2007-298085, dated Jan. 4, 2011.
Office Action from Chinese Patent Application No. 200710195331.5, dated Sep. 30, 2010.
Notice of Final Rejection from Korean Patent Application No. 10-2007-128183, dated Jan. 8, 2011.
Non-Final Office Action from U.S. Appl. No. 11/867,445, dated Feb. 16, 2011.
Non-Final Office Action from U.S. Appl. No. 11/867,418, dated Jan. 18, 2011.
Non-Final Office Action from U.S. Appl. No. 11/611,805, dated Jun. 21, 2011.
Notice of Preliminary Rejection from Korean Patent Application No. 10-2007-0128183 dated Nov. 8, 2010.
Notice of Final Rejection from Japanese Patent Application No. 2007-298085 dated Jul. 19, 2011.
Final Office Action from U.S. Appl. No. 11/867,418 dated Aug. 9, 2011.
Non-Final Office Action from U.S. Appl. No. 11/867,445 dated Aug. 4, 2011.
Office Action from Chinese Patent Application No. 200710195331.5, dated Jun. 9, 2011.
Non-Final Office Action from U.S. Appl. No. 11/867,418, dated Oct. 28, 2011.
Notice of Allowance from U.S. Appl. No. 11/867,418, dated Feb. 16, 2012.
Notice of Allowance from U.S. Appl. No. 11/611,805, dated Jan. 17, 2012.
Decision on Rejection from Chinese Application No. 200710195331.5, dated Dec. 8, 2011.
Notice of Allowance from U.S. Appl. No. 11/867,445, dated Jun. 12, 2012.
Final Office Action from U.S. Appl. No. 11/867,445, dated Mar. 1, 2012.
Office Action from Taiwan Application No. 096143970, dated Mar. 26, 2012.
Notice of Allowance from Taiwan Patent Application No. 096143970, dated Aug. 21, 2012.
Notice of Reexamination from Chinese Patent Application No. 200710195331.5, dated Sep. 10, 2012.
Decision on Appeal from Korean Patent Application No. 10-2007-128183, dated Oct. 23, 2012.
Notice of Reasons for Rejection from Japanese Patent Application No. 2011-103241, dated Jan. 8, 2013.

* cited by examiner

SYSTEM, METHOD AND COMPUTER PROGRAM PRODUCT FOR ADJUSTING A REFRESH RATE OF A DISPLAY

FIELD OF THE INVENTION

The present invention relates to display systems, and more particularly to techniques for refreshing displays.

BACKGROUND

A display refresh rate refers to the number of times an image is re-displayed, or "refreshed" on a display in a given amount of time. A refresh rate is typically expressed in hertz (Hz), thus a refresh rate of 75 means the image is refreshed 75 times in a second, and so on. Traditionally, users have been able to change the refresh rate of a display using a display properties user interface in association with a display adapter, etc.

To date, the range of refresh rates that may be selected by the user has been limited based on properties of the display itself. For example, certain displays such as liquid crystal displays (LCDs) can only display an image with a given intensity for a predetermined amount of time. This characteristic is often referred to display "persistence." Typically, however, refresh rates are set to be at least 60 Hz, 75 Hz or higher to avoid flickering, etc.

Unfortunately, each time a display must be refreshed, additional power is required. There is thus a need for overcoming these and/or other problems associated with the prior art.

SUMMARY

A display refresh system, method and computer program product are provided. In use, at least one aspect of a display of content is identified by monitoring commands. Based on such identified aspect(s), a refresh rate of a display utilized for the display of the content may be adjusted.

DETAILED DESCRIPTION

Figure 1:
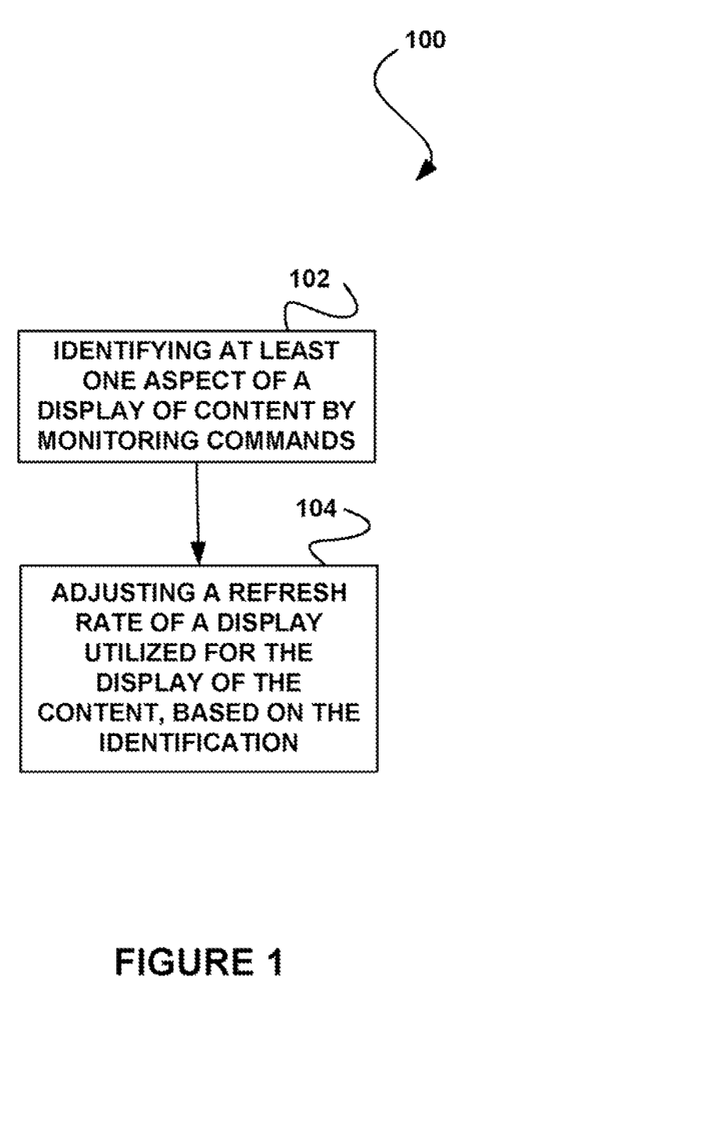
FIG. 1 shows a method for adjusting a refresh rate of a display, in accordance with one embodiment.

FIG. 1 shows a method 100 for adjusting a refresh rate of a display, in accordance with one embodiment. As shown in operation 102, at least one aspect of a display of content is identified by monitoring commands. It should be noted that, in the context of the present description, the term content may refer to any data, at any point of processing, that results in the display of the same.

Further, such commands may include any communication that is at least potentially capable of affecting the aforementioned aspect(s). As will become apparent, the commands may include any communication associated with a graphics processor, a central processing unit (CPU), etc. For that matter, the commands may be associated with any system component capable of initiating such communication. For example, in different embodiments, the various techniques disclosed herein may be applied in the context of any panel driver.

To this end, a refresh rate of a display utilized for the display of the content may be adjusted, based on the identification. See operation 104. In various embodiments, the display may include a liquid crystal display (LCD), digital light processing (DLP) display, liquid crystal on silicon (LCOS) display, plasma display, or any other display capable of refresh rate adjustment, for that matter.

Just by way of example, in one embodiment, the aspect(s) may relate to the content itself. For example, the aspect may include any difference between a first image of the content and a second image of the content. As an option, the second image may be an image that immediately follows the first image.

Figure 2:
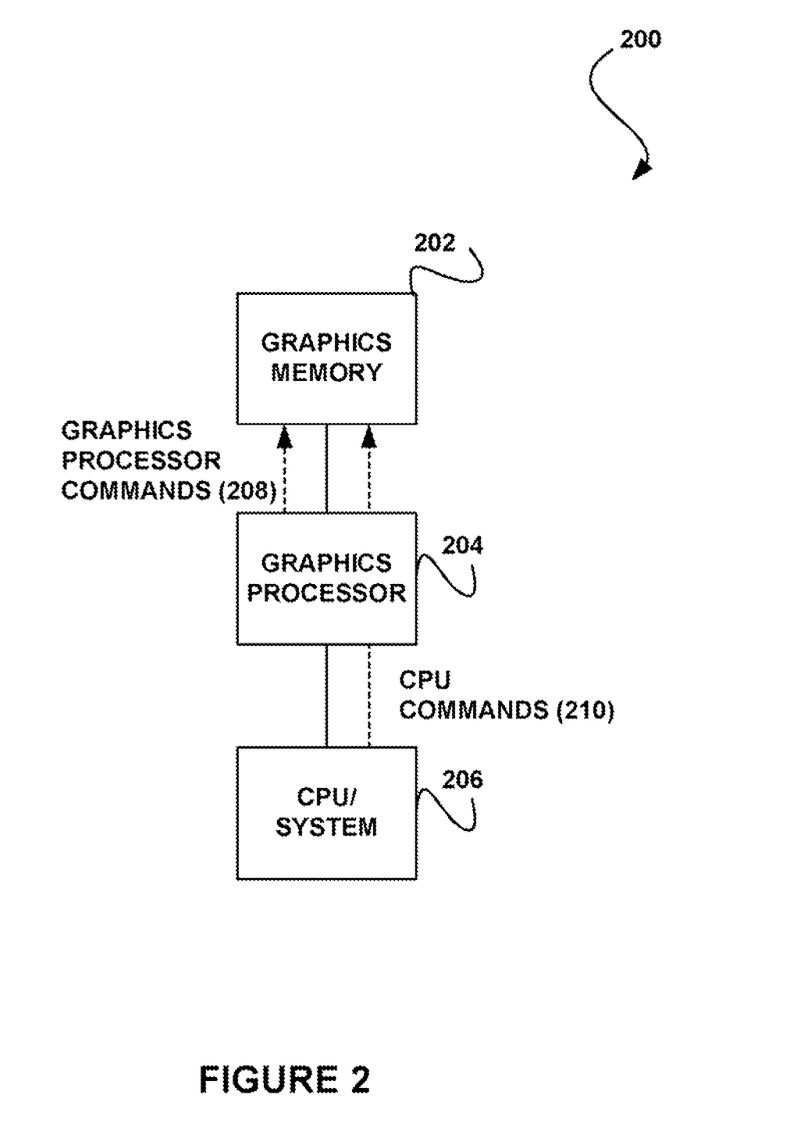
FIG. 2 shows a system for identifying at least one aspect of the display of content for display refresh rate adjustment, in accordance with another embodiment.

Various exemplary techniques for carrying out such identification by monitoring commands will be set forth in greater detail during reference to FIG. 2 and further embodiments. Of course, such difference may be identified in any desired manner that results in the identification thereof. Just by way of example, the identification of such difference may or may not be carried out on a pixel-by-pixel basis.

In one embodiment the refresh rate of the display may be adjusted if the difference is less than a predetermined amount (e.g. a predetermined threshold, no difference, etc.). While embodiments are contemplated where the refresh rate may be adjusted to a higher rate, the refresh rate of the display may, in various embodiments, be adjusted to a lower frequency. Such feature may render power savings, since each refresh requires additional power by the display, power-consuming processing by a graphics processor. I/O-related power, etc, in still other embodiments, a horizontal blanking period (which is not typically displayed) may be augmented. Such increase may result in power savings on the part of the graphics processor and/or display.

In one embodiment, the lower frequency may be selected as a function of various constraints associated with the display. Just by way of example, the lower frequency may be selected as a function of a persistence of the display. Such persistence refers a length of time a display is capable of displaying an image with a given intensity. As such persistence is increased for a particular display, the refresh rate may be lowered to a greater extent, thus saving additional power, etc. As an option, a range of available display clock frequencies may be identified, so that a minimum clock frequency (within such range) may be selected (since such minimum clock frequency is typically representative of a persistence of the display).

In still additional embodiments, the refresh rate may be adjusted dynamically over time based on changes in one or more aspects. More information regarding such an exemplary embodiment will be set forth during the description of FIG. 3. Of course, embodiments involving more static adjustment based on the foregoing aspect(s) are also contemplated.

In other embodiments, additional parameters, etc. (which may or may not necessarily be related to the display of content), may be used to govern any adjustment in the refresh rate. Non-exhaustive examples of such parameters, etc. may include, but are not limited to a level of battery power, existence of alternating current power, etc. Strictly as an option, a policy may be used to conditionally allow the adjustment of refresh rate as a function of such additional parameters, etc.

In even still other embodiments, one or more external aspects may be identified for further adjusting the refresh rate. For example, such aspect(s) may include a level of ambient light in an environment of the display. Such ambient light may, for example, be identified utilizing a sensor (which may or may not have another purpose), a camera, etc. Specifically, upon ambient light dropping to a predetermined level, the refresh rate may also be lowered accordingly.

Thus, in various embodiments, a refresh rate of a display may be adjusted as a function of any desired aspect of the display of content, etc. In some embodiments, such refresh rate may be lowered for power saving purposes. Further, such lowering of the refresh rate may be effected at a time when such would not (to at least a partial extent) degrade a user's viewing experience. For example, when a difference between images is minimal, reduction of the refresh rate is less likely to be noticeable to the user but, at the same time, offer power savings. Of course, in various embodiments, any one or more aspects of the content display may be identified for adjusting a display refresh rate, for any desired purpose.

More illustrative information will now be set forth regarding various optional architectures and uses of different embodiments in which the foregoing method 100 may or may not be implemented, per the desires of the user it should be strongly noted that the following information is set forth for illustrative purposes and should not be construed as limiting in any manner. Any of the following features may be optionally incorporated with or without the exclusion of other features described.

FIG. 2 shows a system 200 for identifying at least one aspect of the display of content for display refresh rate adjustment, in accordance with another embodiment. As an option, the system 200 may be used in the context of the method 100 of FIG. 1. Of course, however, the system 200 may be used in any desired environment. Again, the aforementioned definitions may equally apply to the description below.

As mentioned earlier, one possible aspect that may be identified (see operation 102 of FIG. 1, etc.) may include a difference among images being displayed. Such difference may, in the present embodiment, be identified by monitoring various commands associated with a CPU/system 206, a graphics processor 204, and graphics memory 202 (e.g. frame buffer, etc.). Specifically, such difference may be identified by monitoring commands that are at least potentially capable of resulting in such difference.

For example, any difference in images may be identified by monitoring graphics commands 208 associated with a graphics processor. Such graphics commands 208 may include render commands, writes to the graphics memory 202, and/or any other graphics commands 208 that access the graphics memory 202 and have at least the potential of affecting graphics memory 202.

Still yet, in additional embodiments, the foregoing difference may be identified by monitoring CPU commands 210 associated with the CPU/system 206. Similar to the graphics commands 208, the CPU commands 210 may include any writes to the graphics memory 202, and/or any other CPU commands 210 that access the graphics memory 202 and have at least the potential of affecting graphics memory 202.

While not shown, any difference in images may also be identified by monitoring commands that affect a cursor. In one embodiment, such cursor may refer to a hardware cursor that results from manipulation of an input device (e.g. mouse, keyboard, etc.). Any charge in such cursor (e.g. in movement, size, etc.) may thus result in a difference in images being displayed.

As an option, the aforementioned monitoring of various commands that access the graphics memory 202 may be limited to only those that affect portions of the graphics memory 202 that are currently being displayed. To this end, only accesses that have the potential of resulting in image differences are monitored, for optimal monitoring efficiency. While the foregoing techniques have been set forth as examples of ways to identify differences in images (so that a refresh rate may be adjusted accordingly), it should be noted that others are contemplated. Just by way of example, commands from other unillustrated system components may also be monitored, etc.

Figure 3:
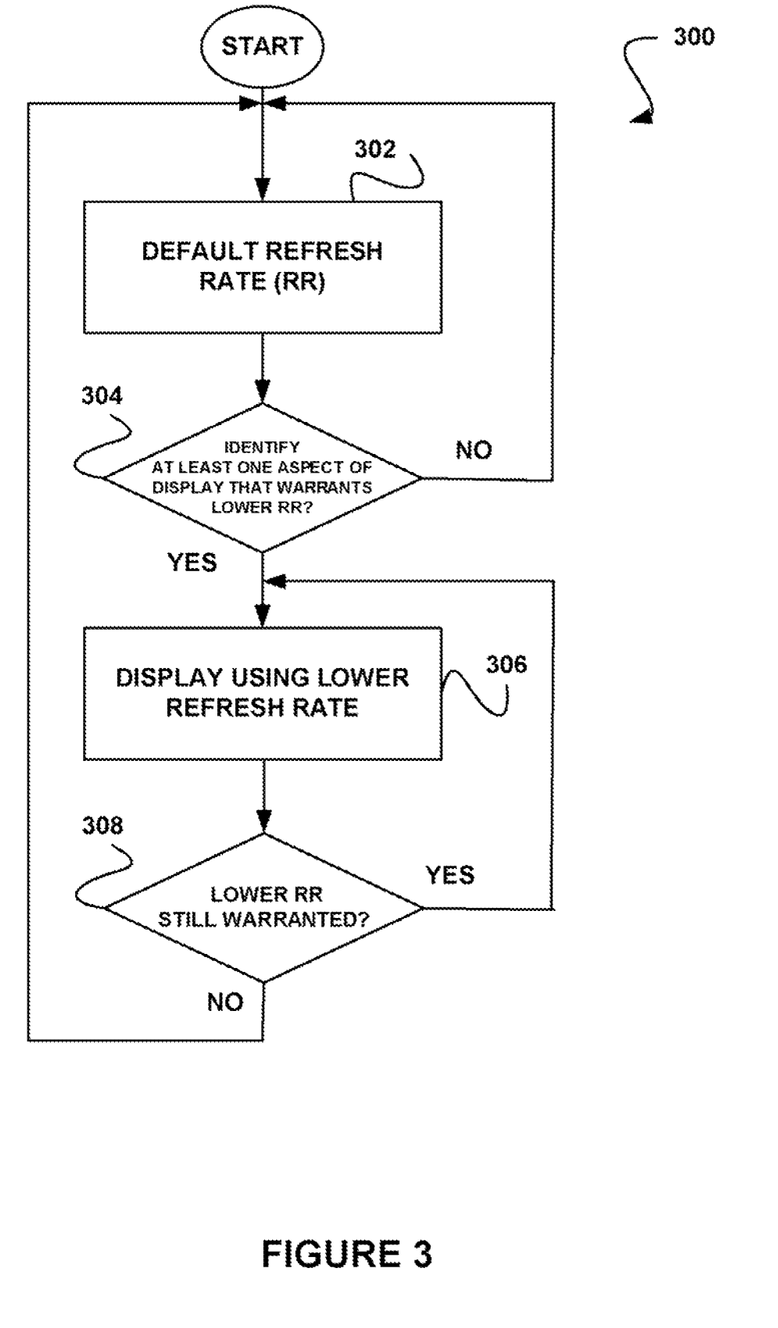
FIG. 3 shows a method for display refresh rate adjustment, in accordance with another embodiment.

FIG. 3 shows a method 300 for display refresh rate adjustment, in accordance with another embodiment. As an option, the method 300 may be carried in the context of the architecture and/or functionality of the previous figures. Of course, however, the method 300 may be used in any desired environment. Again, the aforementioned definitions may equally apply to the description below.

As shown, the present method 300 is dynamic in nature. Specifically, the method 300 operates at a default refresh rate. See operation 302. Such operation continues until at least one aspect of content display is identified which warrants a lower refresh rate (and thus lower power consumption). See decision 304.

If such an aspect is identified per decision 304, the display may be driven at the lower refresh rate for power savings. See operation 306. Further, operation 306 may continue until the lower refresh rate is no longer warranted per decision 308. Specifically, a state of each of the different aspects that are capable of prompting operation 306 may be reviewed to determine whether they still warrant such lower refresh rate. At any time that such determination is made, operation may return to the default refresh rate in operation 302. Of course, the one or more aspect(s) that prompted operation 306 per decision 304 may (but need not necessarily) be that which prompted a return to operation 302 per decision 308.

While a two-level framework is set forth in the present example of FIG. 3, it should be noted that the dynamic adjustment may involve multiple (and possibly incremental) levels that vary as a function of different aspects. Incremental changes may also be mandated by the capabilities of various displays. Further, a look-up table or any algorithm may be utilized to identify the appropriate lowered refresh rate in view of each possible combination of different aspects.

Figure 4:
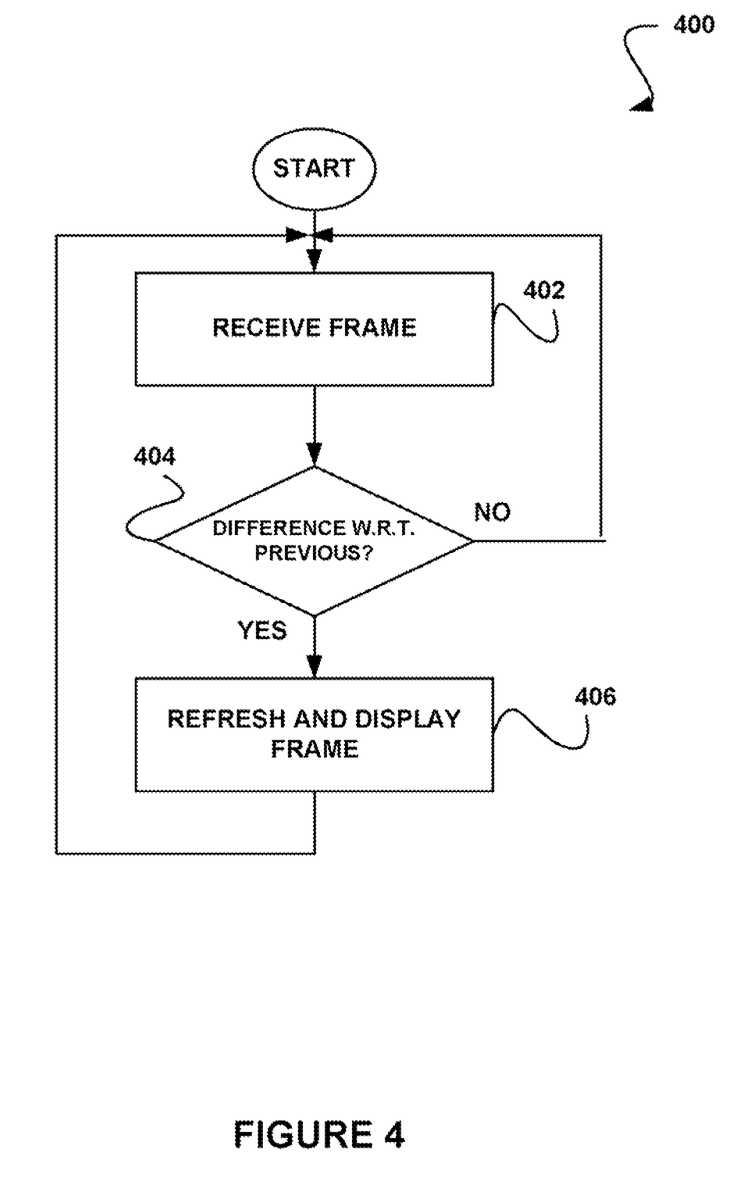
FIG. 4 shows a method for skipping the display of images, in accordance with yet another embodiment.

FIG. 4 shows a method 400 for skipping the display of images, in accordance with another embodiment. As an option, the method 400 may be carried in the context of the architecture and/or functionality of the previous figures and specifically supplement the refresh rate adjustment technique. Of course, however, the method 400 may be used in any desired environment (e.g. without the refresh rate adjustment techniques mentioned above, etc.). Again, the aforementioned definitions may equally apply to the description below.

As shown, a frame (e.g. image) may be received in operation 402, after which it may be determined whether a difference exists with respect to the previous frame. See decision 404. Of course, such difference may be identified in any desired manner. Note, for example, the techniques discussed hereinabove during reference to FIG. 2. While the decision 404 is shown to be prompted by any difference in the frames, it should be noted such decision may be prompted by any other aspect associated with the display of content, as discussed above.

If and only if such difference exists per decision 404, the display is refreshed with the frame. See operation 406. To this end, the display of a frame may be conditionally skipped when appropriate, for power saving purposes. In various embodiments, the display itself may be configured to support such conditional frame skipping.

Similar to the embodiments of previous figure, the present method 400 may be configured to support a given display persistence capacity. For example, a limit may be configured to ensure that only a predetermined number of frames may be consecutively skipped. Further, in addition to the power savings mentioned above with respect to previous embodiments, an I/O subsystem associated with the display may even be optionally disabled when a frame is skipped, thus affording additional time savings.

Figure 5:
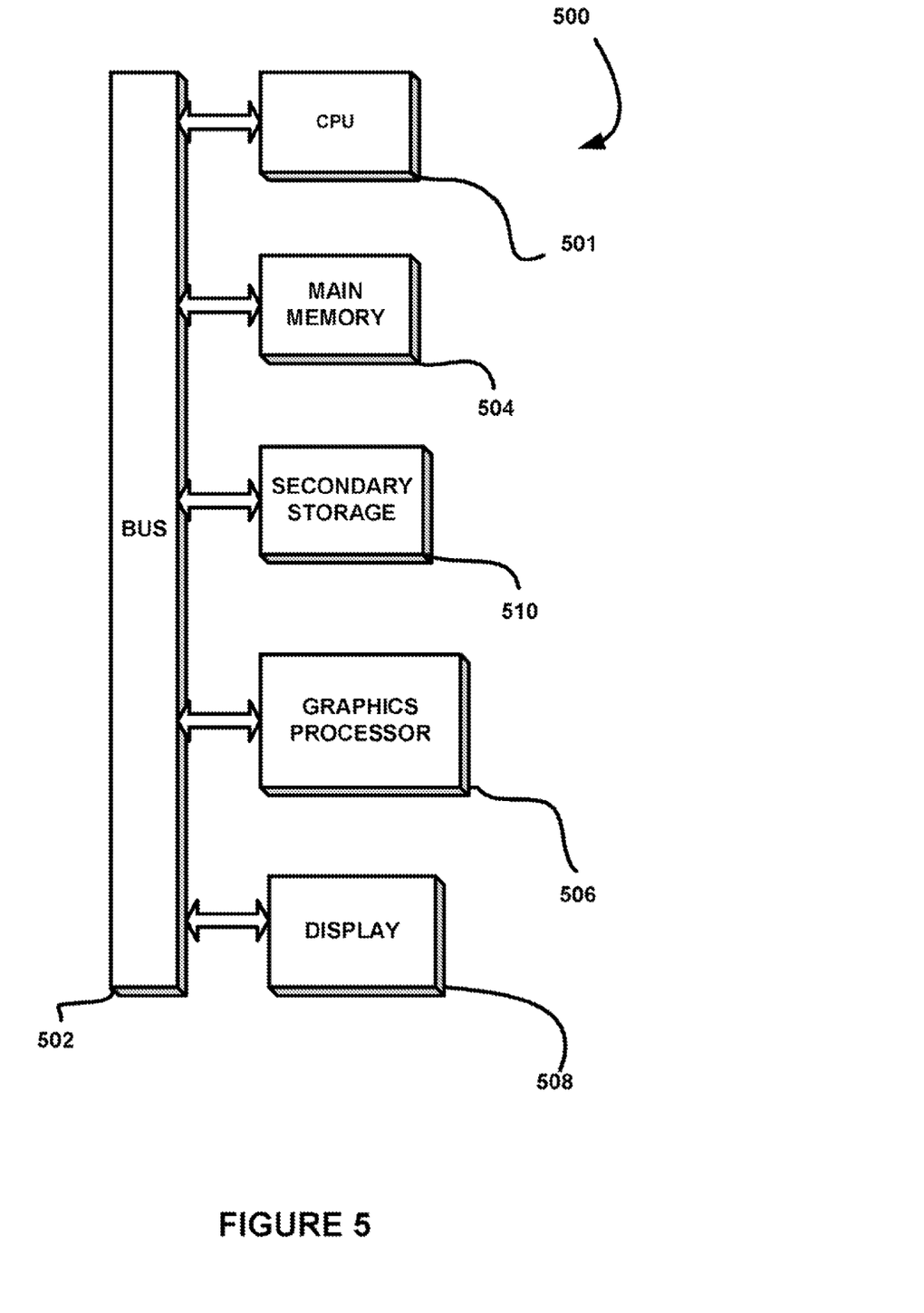
FIG. 5 illustrates an exemplary system in which the various functionality of the previous figures may be implemented, in accordance with one embodiment.

FIG. 5 illustrates an exemplary system 500 in which the various architecture and/or functionality of the previous embodiments may be implemented, in accordance with one embodiment. Of course, however, the system 500 may be implemented in any desired environment.

As shown, a system 500 is provided including at least one CPU 501 which is connected to a communication bus 502. The system 500 also includes main memory 504 [e.g. random access memory (RAM), etc.]. The system 500 also includes a graphics processor 506 and a display 508 which may take any form including, but not limited to those set forth during reference to FIG. 1. In one embodiment, the graphics processor 606 may include a plurality of shader modules, a rasterization module, etc. Each of the foregoing modules may even be situated on a single semi conductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 500 may also include a secondary storage 510. The secondary storage 510 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 504 and/or the secondary storage 510. Such computer programs, when executed, enable the system 500 to perform various functions. Memory 504, storage 510 and/or any other storage are possible examples of computer-readable media.

In one embodiment, the architecture and/or functionality of die various previous figures may be implemented in the context of the CPU 501, graphics processor 506, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, a mobile system, and/or any other desired system, for that matter. Just by way of example, the system may include a desktop computer, lap-top computer, hand-held computer, mobile phone, personal digital assistant (PDA), peripheral (e.g. printer, etc.), any component of a computer, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
identifying a difference between a first image of content and a second image of the content by:
identifying a subset of data in a frame buffer that is currently being displayed by a display device, and
monitoring only write commands from a processor to the subset of data in the frame buffer that is currently being displayed by the display device;
determining a persistence capacity of the display device utilized for the display of the content, the persistence capacity of the display device including a length of time the display device is capable of displaying the content at a predetermined intensity; and
dynamically adjusting a refresh rate of the display device utilized for the display of the content, based on the difference identified by monitoring only the write commands to the subset of data in the frame buffer that is currently being displayed by the display device, and based on the persistence capacity of the display device, utilizing a processor;
wherein the difference between the first image of the content and the second image of the content is identified on a pixel-by-pixel basis;
wherein dynamically adjusting the refresh rate of the display device causes a display of at least one image of the content to be skipped, and a limit for the dynamic adjustment of the refresh rate of the display device is configured to support the persistence capacity of the display device, such that the limit allows only a predetermined number of images of the content to be consecutively skipped utilizing the adjusted refresh rate.

2. The method of claim 1, wherein the refresh rate of the display device is adjusted if the difference is less than a predetermined amount.

3. The method of claim 1, wherein the refresh rate of the display device is lowered if the difference is less than a predetermined amount.

4. The method of claim 3, wherein the refresh rate of the display device is lowered if there is no difference between the first image of the content and the second image of the content.

5. The method of claim 1, wherein the write commands are associated with a graphics processor.

6. The method of claim 1, wherein the write commands are associated with a central processing unit.

7. The method of claim 1, wherein the write commands affect a cursor.

8. The method of claim 1, wherein the identified difference includes a difference in a pixel during the display of the first image and the second image.

9. The method of claim 1, wherein the refresh rate of the display device is adjusted to a lower frequency.

10. The method of claim 9, wherein the display device includes a liquid crystal display.

11. A method, comprising:
identifying a level of ambient light in an environment of a display device;
determining a persistence capacity of the display device utilized for a display of content, the persistence capacity of the display device including a length of time the display device is capable of displaying the content at a predetermined intensity;

identifying a difference between a first image of the content and a second image of the content immediately following the first image by:
  identifying a subset of data in a frame buffer that is currently being displayed by the display device, and
  monitoring only write commands from a processor to the subset of data in the frame buffer that is currently being displayed by the display device; and adjusting a refresh rate of the display device, based on the persistence capacity of the display device, the ambient light level, and the difference identified by monitoring only the write commands to the subset of data in the frame buffer that is currently being displayed by the display device, utilizing a processor;

wherein the refresh rate is lowered upon the level of the ambient light dropping to a predetermined level;

wherein the difference between first image and the second image is identified on a pixel-by-pixel basis;

wherein adjusting the refresh rate of the display device causes a display of at least one image of the content to be skipped, and a limit for the adjustment of the refresh rate of the display device is configured to support the persistence capacity of the display device, such that the limit allows only a predetermined number of images of the content to be consecutively skipped utilizing the adjusted refresh rate.

12. A system, comprising:
a processor for:
  identifying a difference between a first image of content and a second image of the content to be displayed by:
    identifying a subset of data in a frame buffer that is currently being displayed by a display device, and
    monitoring only write commands from another processor to the subset of data in the frame buffer that is currently being displayed by the display; and
  determining a persistence capacity of the display device utilized for the display of the content, the persistence capacity of the display device including a length of time the display device is capable of displaying the content at a predetermined intensity;

wherein the display of the second image is skipped by dynamically adjusting a refresh rate of the display device, based on the difference identified by monitoring only the write commands to the subset of data in the frame buffer that is currently being displayed by the display device, and the persistence capacity of the display;

wherein the processor is operable such that the difference between the first image and the second image is identified on a pixel-by-pixel basis;

wherein the processor is operable such that the dynamic adjustment of the refresh rate of the display device causes the display of the second image of the content to be skipped, and a limit for the dynamic adjustment of the refresh rate of the display device is configured to support the persistence capacity of the display device, such that the limit allows only a predetermined number of images of the content to be consecutively skipped utilizing the adjusted refresh rate.

13. The system as recited in claim 12, wherein the processor includes a graphics processor.

14. The system as recited in claim 13, wherein the graphics processor is in commination with a central processing unit via a bus.

15. The method of claim 1, wherein a horizontal blanking period of the display is augmented based on the difference between the first image and the second image of the content.

16. The method of claim 1, wherein a look-up table is utilized to identify an appropriate refresh rate in view of the difference between the first image of the content and the second image of the content.

17. The method of claim 9, wherein a range of available clock frequencies is identified based on the persistence capacity of the display device, and wherein the lower frequency to which the display device is adjusted, based on the difference identified by monitoring only the write commands to the subset of data in the frame buffer that is currently being displayed by the display device and the persistence capacity of the display device, is within the identified range.

18. The method of claim 1, further including identifying an additional parameter for governing the dynamic adjustment of the refresh rate of the display device, the additional parameter including a level of power of a battery.

19. The method of claim 1, further including identifying an additional parameter for governing the dynamic adjustment of the refresh rate of the display device, the additional parameter including an alternating current power source.

20. The method of claim 1, wherein only the write commands from the processor to the subset of data in the frame buffer that is currently being displayed are monitored such that only accesses of the frame buffer having a potential of resulting in the difference between the first image of the content and the second image of the content are monitored.

21. The method of claim 1, wherein the monitored write commands to the subset of data in the frame buffer that is currently being displayed by the display device are central processing unit commands from a central processing unit.

22. The method of claim 1, wherein the monitored write commands to the subset of data in the frame buffer that is currently being displayed by the display device are graphics processing unit commands from a graphics processing unit.

23. The method of claim 1, further comprising, in response to skipping the display of the at least one image of the content, disabling an I/O subsystem associated with the display device for saving power.

* * * * *